United States Patent [19]

Gardiner

[11] Patent Number: 5,840,801
[45] Date of Patent: Nov. 24, 1998

[54] METHOD FOR IMPROVING DISPERSION AND COMPATIBILITY OF ZINC SALTS IN ELASTOMERIC COMPOUNDS DURING VULCANIZATION

[75] Inventor: Eric S. Gardiner, Westtown, N.Y.

[73] Assignee: Arizona Chemical Company, Panama City, Fla.

[21] Appl. No.: 669,058

[22] Filed: Jun. 24, 1996

[51] Int. Cl.$^6$ .............................. C08L 29/02; C08L 93/04
[52] U.S. Cl. .................. 525/54.44; 525/54.4; 525/54.42; 525/63; 525/90; 525/92 A; 525/92 F; 525/240; 525/332.5
[58] Field of Search ............................... 525/54.44, 54.42, 525/54.4, 63, 90, 92 A, 92 F, 240, 326.3, 404, 408, 332.5

[56] References Cited

U.S. PATENT DOCUMENTS

| | | | |
|---|---|---|---|
| 2,589,919 | 3/1952 | Arundale et al. | 524/574 |
| 2,676,951 | 4/1954 | McCracken et al. | 524/706 |
| 2,686,165 | 8/1954 | Fryling et al. | 524/764 |
| 3,166,524 | 1/1965 | Schmidie et al. | 524/500 |
| 3,717,600 | 2/1973 | Dalhuisen et al. | 524/110 |
| 3,883,145 | 5/1975 | Cox et al. | 473/372 |
| 4,032,491 | 6/1977 | Schoenke | 524/68 |
| 4,383,108 | 5/1983 | Jorgensen, Jr. | 528/485 |
| 4,426,488 | 1/1984 | Wyman | 524/783 |
| 4,431,704 | 2/1984 | Springer | 428/450 |
| 4,477,619 | 10/1984 | Lattimer et al. | 524/171 |
| 4,543,193 | 9/1985 | Peter et al. | 252/8.55 B |
| 4,576,648 | 3/1986 | Demangeon et al. | 106/269 |
| 4,603,899 | 8/1986 | Iwasa | 296/154 |
| 4,623,414 | 11/1986 | Collins et al. | 156/307.5 |
| 4,632,847 | 12/1986 | Lomasney et al. | 427/154 |
| 4,669,517 | 6/1987 | Krishnan | 152/209 R |
| 4,742,137 | 5/1988 | Ono et al. | 526/92 |
| 4,838,556 | 6/1989 | Sullivan | 273/220 |
| 4,853,434 | 8/1989 | Block | 525/100 |
| 4,894,408 | 1/1990 | Hazelton et al. | 524/425 |
| 4,910,267 | 3/1990 | Oyama et al. | 525/352 |
| 5,183,840 | 2/1993 | Erpelding et al. | 524/228 |
| 5,240,985 | 8/1993 | Gardiner | 524/274 |
| 5,247,015 | 9/1993 | Bayan | 525/99 |
| 5,271,991 | 12/1993 | Gardiner et al. | 428/195 |
| 5,284,906 | 2/1994 | Schulz et al. | 524/710 |
| 5,284,907 | 2/1994 | Schulz et al. | 524/710 |

*Primary Examiner*—Mark L. Warzel
*Attorney, Agent, or Firm*—Luedeka, Neely & Graham P.C.

[57] ABSTRACT

The invention disclosed herein relates to methods for vulcanizing elastomeric materials. The method comprises providing a mixture of ZnO and an amphiphilic triblock copolymer selected from the group consisting of rosin and $C_{18}$–$C_{24}$ fatty acid esters of polyethylene glycol and the use of the mixture for vulcanizing an elastomeric component with sulfur. The mixture not only improves the dispersion of zinc salts in the elastomeric composition but also reduces mold fouling by reducing the migration of zinc salts to the interfacial area of the elastomeric composition.

23 Claims, No Drawings

5,840,801

METHOD FOR IMPROVING DISPERSION AND COMPATIBILITY OF ZINC SALTS IN ELASTOMERIC COMPOUNDS DURING VULCANIZATION

The invention relates to improved vulcanization processes and methods for dispersing zinc salts in elastomeric compositions during vulcanization.

BACKGROUND

Many elastomeric materials may be vulcanized using sulfur and sulfur compounds. Elastomeric materials which may be vulcanized include, but are not limited to, styrene-butadiene polymers, polyisoprene, butyl rubber, halogenated butyl rubbers, chlorosulfonated polyethylene, polybutadiene, nitrile rubber, chloroprene rubbers, and ethylene-propylene terpolymers. Curing of the elastomeric materials during vulcanization may include mold curing, injection curing, steam curing, hydraulic curing, air curing and special or combination curing.

During mold curing, fouling of the mold due to build-up of deposits is a common problem, particularly in the tire industry. Effects may range from diminished aesthetic value of the molded part to actual interference in the physical properties of the product. The deposits may also cause problems with venting of gases from the mold.

Zinc Oxide is typically used to increase the cure rate of the elastomeric materials and improve the aging process as well as the physical properties of the elastomeric material. One of the principal deposits which may affect a molded part is a zinc salt resulting from combination of zinc oxide with one or more of the vulcanization agents such as sulfur.

Zinc salts tend to migrate to or collect adjacent the surface of the elastomeric material during vulcanization and curing and/or deposit on the surface of the mold. When the deposits become excessive, the mold must be cleaned or replaced.

Methods for cleaning the molds include sanding, grit blasting and/or the use of chemicals. Not only does sanding, grit blasting and chemical cleaning result in production interruptions, but these procedures tend to reduce the life of the molds.

Improvements in the processing of rubber and other vulcanizable elastomeric materials have been proposed. However, mold fouling remains a significant problem despite the use of various dispersants and surfactants, including non-ionic water soluble surfactants.

U.S. Pat. No. 3,717,600 to Dalhuisen et al. discloses use of a combination of a water soluble surfactant and a plasticizer to aid the dispersion of MgO, which is used to reduce scorch and provide improved processing and storage safety of unvulcanized neoprene. The nonionic surface active agents disclosed by Dalhuisen et al. include mono and diglycerides, sorbitan fatty acid esters, polyoxyethylene sorbitan fatty acid esters, polyoxyethylene sorbitol esters, polyoxyethylene acids, fatty alcohols, polyethylene glycols, nonylphenoxypoly(ethylene-oxy)ethanols, fatty acid esters of glycerol, ethylene glycol, di-and polyethylene glycol and propylene glycol, and tetraesters of pentaerythritol and fatty acids. Ionic agents include alkyl aryl sulfonates. Dalhuisen et al. do not suggest methods to reduce mold fouling caused by the deposition of zinc salts.

U.S. Pat. No. 4,838,556 to Sullivan discloses use of a dispersing agent with the core composition of a golf ball to increase the coefficient of restitution of the core. The golf ball core composition is based on polybutadiene and mixtures of polybutadiene with other elastomers, an unsaturated carboxylic acid, a free radical initiator, and a dispersing agent. The dispersing agents include alkali metal salts of fatty acids, sodium salts of alkylated aromatic sulfonic acids, monoaryl and monoalkyl ethers of dialkylene glycols, ammonium salts of alkyl phosphates, sodium salts of carboxylated electrolytes, sodium alkyl sulfates and monosodium salt of sulfated methyl oleate. According to Sullivan, the core compositions may also include other components such as fillers, metal oxides, fatty acids and diisocyanates. Suitable fillers include silica, silicates, zinc oxide, carbon black, cork, titania, cotton flock, cellulose flock, leather fiber, plastic and/or leather flour, asbestos, glass fibers, metal carbonates and talc. Sullivan does not describe the vulcanization of elastomeric compounds nor does he suggest any method for reducing mold fouling or modification of the surface characteristics of the golf ball cores.

U.S. Pat. No. 5,284,906 to Schulz et al. describes a process for preparing rubber containing polymer bound functionalities. The Schulz et al. process involves emulsion polymerization of a functionalized monomer which contains a polymerizable vinyl group with a copolymerizable conjugated diene monomer in the presence of an ionic surfactant and a plasticizer. The emulsion polymerization disclosed by Schulz et al. is conducted using a free radical initiator system which is known in the art for low temperature polymerization.

Plasticizers for the Schulz et al. process may be selected from diesters of triethylene glycol, dibutoxyethoxyethyl formate, dialkyl diether glutarate, dibutoxyethyl adipate, dibutoxyethoxyethyl adipate, di-2-ethylhexyl adipate, tetraethylene glycol diheptanoate, propylene glycol dibenzoate, dipropylene glycol dibenzoate, triethylene glycol dibenzoate, butyl octyl phthalate, dimethyl phthalate, diethylphthalate, dibutyl phthalate, dibutoxy ethylphthalate, di-2-ethylhexanoate, triethylene glycol caprate-caprylate, triethylene glycol di(caprate-caprylate), triethylene glycol diperlargonate, dibutyl sebacate, dibutoxyethyl sebacate, di-2-ethylhexyl sebacate, dioctyl sebacate, diethylene glycol mono-laurate, butoxyethyl oleate, n-butylbenzene sulfonamide and certain phosphates and formals.

While many types of surfactants and dispersants have been proposed for use during the polymerization of elastomeric compounds, there still remains a need for compounds and processes which will significantly reduce mold fouling and prevent the migration or accumulation of certain byproduct salts to adjacent the surface of elastomeric compositions during vulcanization and curing.

An object of the present invention is to provide a process for the vulcanization of an elastomeric material which will reduce mold fouling.

Another object of the invention is to provide an elastomeric composition which may be used during vulcanization to reduce mold fouling.

Still another object of the invention is to provide a vulcanization process by which undesired migration of one or more zinc salts is reduced.

Another object of the invention is to provide elastomeric compositions for vulcanization which reduce undesired migration of zinc salts in an elastomeric composition during vulcanization.

A further object of the invention is to provide a method for improving the aesthetic nature of the surface of a vulcanized elastomeric material.

The Invention

With regard to the foregoing and other objects, the present invention provides a process for vulcanizing an elastomeric material. The process comprises providing a mixture including ZnO and an amphiphilic triblock copolymer (ATC) selected from the group consisting of rosin and $C_{18}$–$C_{24}$ fatty acid diesters of polyethylene glycol (PEG) of from about 350 to about 1000 amu. The ZnO/ATC dispersed mixture is combined with an elastomeric component and sulfur to provide a reaction mixture which is then vulcanized.

The ATC is effective to disperse the ZnO in the reaction mixture to a high degree, approaching solubility, against the very strong tendency of ZnO to migrate to adjacent the outer surface of the reaction mass during vulcanization. Thus, during vulcanization, byproduct zinc salts, such as zinc sulfide, remain substantially dispersed in the elastomeric composition. Dispersion of the zinc salts in the elastomeric composition not only improves the aesthetics of the resulting elastomeric material, it also brings about a dramatic reduction in mold fouling.

In another aspect, the invention provides a vulcanizable elastomeric composition comprising an elastomeric component, sulfur, ZnO and an amphiphilic triblock copolymer (ATC) selected from the group consisting of rosin and $C_{18}$–$C_{24}$ fatty acid diesters of polyethylene glycol (PEG) 350 to PEG 1000 amu, wherein the amount of ZnO in the mixture ranges from about 1% to about 4% by weight based on the elastomeric component in the composition and the amount of ATC ranges from about 10 to about 100% by weight based on the weight of ZnO in the mixture. Elastomeric compositions containing ATC according to the invention have been found to greatly reduce the migration of zinc oxide so that the byproduct zinc salts are more uniformly dispersed in the vulcanized product resulting in reduced fouling of the molds used to shape and/or cure the materials.

Another aspect of the invention relates to a vulcanized elastomeric material comprising an elastomeric matrix having dispersed therein one or more zinc salts with an amphiphilic triblock copolymer (ATC) selected from the group consisting of rosin and $C_{18}$–$C_{24}$ fatty acid esters of PEG 400 to PEG 1000 dispersed in interfacial relationship with the zinc salts and the elastomeric matrix. By "interfacial" it is meant that the ATC surrounds, envelopes or is otherwise disposed between individual zinc salt molecules or zinc salt molecular aggregations and elements of the elastomeric matrix. As will be appreciated, the interfacial disposition of the ATC results from the ability of the ATC to very finely and uniformly disperse a zinc oxide component of a mixture used to make the elastomeric material and its ability to thereafter limit migration of the zinc salts formed during the vulcanization process to the area adjacent the interface of the elastomeric material and the mold.

The compositions and methods of the invention provide a significant advance in the vulcanization process for elastomeric materials. Many of the non-ionic water soluble surfactants which have previously been used with elastomeric compositions are relatively ineffective for reducing mold fouling. Surprisingly, however, use of ATC compounds according to the present invention has achieved a dramatic reduction in mold fouling while providing other beneficial improvements in the surface characteristics of the elastomeric materials containing the compounds.

It is preferred that the amphiphilic compounds be comprised of tri-block copolymers having the general structure of an A-B-A block copolymer. The end blocks, A, of the block copolymer may be selected from rosin and fatty acids, preferably $C_{18}$–$C_{24}$ fatty acids. The rosin and fatty acids which may be used as the A-blocks of the copolymer typically have an acid number of greater than about 170 and are substantially hydrophobic in nature.

Fatty acids which may be used as the A-blocks of the copolymer include the $C_{18}$–$C_{24}$ saturated and unsaturated fatty acids selected from elaidic acid, petroselinic acid, elaeostearic acid, arachidonic acid, oleic acid, linoleic acid, linolenic acid, erucic acid, brassidic acid and mixtures of two or more of the foregoing acids. Particularly preferred fatty acids are the $C_{18}$ mono-and di-unsaturated tall oil fatty acids.

Rosin acids for use in the invention include the abietic and pimaric types of acids having the general formula $C_{20}H_{28-32}O_2$ and having a partially hydrogenated phenanthrene nucleus. Rosin acids are commonly derived by the acidification and fractionation of the extracts isolated from the waste liquors of the alkaline pulping of pine trees.

The B-block of the copolymer is a polymeric compound derived from a polyhydric alcohol, preferably a dihydric alcohol. Suitable polymeric dihydric alcohols which may be used as the B-blocks of the copolymer include polyethylene glycol, polypropylene glycol, polybutylene glycol and the like. A particularly preferred B-block material is polyethylene glycol (PEG) having a molecular weight in the range of from about 350 to about 1000 amu, most preferably from about 400 to about 800 amu.

The ATC compounds used in the compositions and methods of the invention may be prepared from the rosin or fatty acid and polyhydric alcohol by conventional condensation reaction techniques. In particular, the ATC may be made by reacting polyethylene glycol having a molecular weight in the range of from about 350 to about 1000 amu with a slight excess over two equivalent weights of the acid. The reaction between the acid and glycol is preferably conducted at a temperature in the range of from about 200° to about 300° C. in the presence of from about 0.2 to about 0.8 grams of an acidic catalyst which may be selected from $H_3PO_2$ and para-toluene sulfonic acid for about 10 to 50 hours. During the reaction, the reaction mass is stirred under a nitrogen atmosphere and water is removed from the reaction vessel and collected as condensate. After completion of the reaction, the reaction mass product is stripped under subatmospheric pressure of unreacted acid. Methods for preparing ATC according to the invention are more fully described in U.S. Pat. No. 5,271,991 to Gardiner et al. and U.S. Pat. No. 5,240,985 to Gardiner, incorporated herein by reference as if fully set forth.

The ATC compounds of the invention may be used in the vulcanization of a wide variety of elastomeric materials including, but not limited to, the natural and synthetic rubber compounds derived from alkenes such as ethylene, propylene, butadiene, isobutylene, isoprene, styrene and the like. Particularly preferred elastomeric compounds include, but are not limited to, polyisoprene (P), polybutadiene (PBD), styrene-butadiene rubber (SBR) and ethylene-propylene- diene monomer (EPDM).

The methods for preparing mixtures of ZnO and ATC are not critical to the invention and may include any of the methods known to those of ordinary skill. Accordingly a blend of ZnO and ATC may be prepared by blending solid ZnO with molten ATC or by dry blending the ZnO and ATC as solids.

In order to illustrate certain aspects of the invention, the following non-limiting examples are given.

EXAMPLE 1

Pigment (ZnO or ZnS) was crushed to a fme powder with a mortar and pestle. The powder was dried in a vacuum oven at 45° C. overnight to remove adsorbed water. Rubber (0.5 grams), pigment (0.01 grams) and the ATC compound were added to glass jars. Toluene, which was dried over a molecular sieve, was added to make a 3% by weight solution of rubber, pigment and agent.

The jars were then sealed and mixed overnight on a jar mill at 23° C. until the rubber was dissolved. After mixing, the solutions were allowed to stand 24 hours at room temperature to permit settling. The liquid portion of the solution were then observed for turbidity.

Next the solutions were remixed with an internal magnet stirrer until completely homogeneous. While homogenous, a sample was removed and coated on a glass slide using a Doctor blade thereby forming a uniform film on the glass slide. The films were dried at room temperature and then overnight in a vacuum oven at 45° C. to remove any remaining toluene. The films were observed by transmission optical microscopy at 190× to determine pigment particle size and uniformity of distribution. Tables 1 and 2 summarize the results. Table 1 shows the results of ZnS dispersion in both polyisoprene and polybutylene using five compounds, each at 2 wt. % concentration. Table 2 shows the results of selection of the best candidates from Table 1 to disperse ZnO.

rubber composition, films of polyisoprene containing ZnS were subjected to a cure cycle of 20 minutes at 150° C. (unvulcanized) and the surface examined for the presence of ZnS by Scanning Electron Microscopy (SEM) with Energy Dispersive X-ray Analysis (EDXA). The results of EDXA are given in Table 3.

TABLE 3

| Dispersant | Cure Time (min.) | Sulfur Counts | % Change | Zinc Counts | % Change |
|---|---|---|---|---|---|
| None | 0 | 1116 | — | 417 | — |
| None | 20 | 2310 | 107 | 1241 | 198 |
| TOFA/PEG 400 | 0 | 977 | — | 334 | — |

TABLE 1

| Rubber | Pigment | ATC Compound | Solution Turbidity | Microscopic Examination: Cast Film |
|---|---|---|---|---|
| polyisoprene | 2 wt. % ZnS | none | slight haze, large particles | non-uniform distribution, large particles |
| polyisoprene | 2 wt. % ZnS | TOFA/PEG 400[1] | some haze, very fine precipitate | good dispersion |
| polyisoprene | 2 wt. % ZnS | TOFA/PEG 600 | clear, coarse precipitate | good dispersion |
| polyisoprene | 2 wt. % ZnS | TOFA/PEG 1000[3] | clear, coarse precipitate | not uniform, some agglomerated particles |
| polyisoprene | 2 wt. % ZnS | Rosin/PEG 600 | clear, coarse precipitate | not uniform, some agglomerated particles |
| polyisoprene | 2 wt. % ZnS | Rosin/PEG 1000 | slight haze, coarse precipitate | not uniform, some agglomerated particles |
| polybutadiene | 2 wt. % ZnS | none | clear, all ZnS on bottom, large particles | not uniform, large particles |
| polybutadiene | 2 wt. % ZnS | TOFA/PEG 400 | haze, very fine precipitate | good dispersion |
| polybutadiene | 2 wt. % ZnS | TOFA/PEG 600 | slight haze, fine precipitate | good dispersion |
| polybutadiene | 2 wt. % ZnS | TOFA/PEG 1000 | slight haze, fine | not uniform, some agglomerated particles |
| polybutadiene | 2 wt. % ZnS | Rosin/PEG 600 | clear, coarse precipitate | not uniform, some agglomerated particles |
| polybutadiene | 2 wt. % ZnS | Rosin/PEG 1000 | clear, coarse precipitate | not uniform, some agglomerated particles |
| polyisoprene | 2 wt. % ZnO | TOFA/PEG 400 | opaque haze, some agglomeration | good dispersion |

[1]TOFA/PEG 400 - tall oil fatty acid/polyethylene glycol (amu 400)
[2]TOFA/PEG 600 - tall oil fatty acid/polyethylene glycol (amu 600)
[3]TOFA/PEG 1000 - tall oil fatty acid/polyethylene glycol (amu 1000)

TABLE 2

| Rubber | Pigment | ATC Compound | Solution Turbidity | Microscopic Examination: Cast Film |
|---|---|---|---|---|
| polyisoprene | 2 wt. % ZnO | none | slight haze, large particles | non-uniform distribution, large particles |
| polyisoprene | 2 wt. % ZnO | TOFA/PEG 400[1] | some haze, very fine precipitate | good dispersion |
| polyisoprene | 2 wt. % ZnO | TOFA/PEG 600[2] | clear, coarse precipitate | good dispersion |
| polyisoprene | 2 wt. % ZnO | TOFA/PEG 1000[3] | clear, coarse precipitate | not uniform, some agglomerated particles |
| polyisoprene | 2 wt. % ZnO | Rosin/PEG 600 | clear, coarse precipitate | not uniform, some agglomerated particles |
| polyisoprene | 2 wt. % ZnO | Rosin/PEG 1000 | slight haze, coarse precipitate | not uniform, some agglomerated particles |
| polybutadiene | 2 wt. % ZnO | none | clear, all ZnS on bottom, large particles | not uniform, large particles |
| EPDM[4] | 2 wt. % ZnO | TOFA/PEG 400 | haze, very fine precipitate | good dispersion |
| EPDM | 2 wt. % ZnO | TOFA/PEG 600 | slight haze, fine precipitate | good dispersion |

[4]EPDM - ethylene-propylene-diene monomer

As illustrated by the foregoing Example 1 and Tables 1 and 2 the dispersion of ZnO using the ATC compounds according to the invention is accomplished easier than the dispersion of ZnS powder. However, since zinc is charged to a elastomeric composition as ZnO to act as a cure accelerator, this is ideal. Hence, the dispersing agent is already at the site where the ZnS forms and thus will tend to hold the ZnS at that site. As illustrated by the results given in Table 2, films containing the ATC compound according to the invention produced good to excellent dispersion of the ZnO in the indicated rubbers.

In order to demonstrate that the use of the ATC compounds according to the present invention may result in a reduction of the migration of zinc salts to the surface of the TABLE 3-continued

| Dispersant | Cure Time (min.) | Sulfur Counts | % Change | Zinc Counts | % Change |
|---|---|---|---|---|---|
| TOFA/PEG 400 | 20 | 1437 | 47 | 789 | 136 |
| TOFA/PEG 600 | 0 | 1260 | — | 449 | — |
| TOFA/PEG 600 | 20 | 2162 | 72 | 1143 | 155 |

As illustrated in the foregoing table, there is a 30 to 60% reduction in the migration of ZnS in the unvulcanized films containing the ATC compounds as compared to rubber compositions which do not contain any of the compounds.

In order to demonstrate the cure kinetics of dispersed ZnO in elastomeric compositions with and without the use of the ATC compounds for curing elastomeric compounds according to the invention, the following example is given.

EXAMPLE 2

Polyisoprene elastomeric compositions were prepared with and without the ATC compounds. Each composition contained 2 percent by weight ZnO and 4 percent by weight elemental sulfur based on the total weight of the elastomeric composition. Elastomeric films of the compositions were cast from a toluene solution and were measured for reactivity using Differential Scanning Calorimetry (DSC) and shear rheometry. The DSC films were isothermally cured at 190° C. and the rheology films were cured at 180° C. Table 4 contains the peak reaction time and total cure enthalpy from DSC and the percent decrease of loss modulus (G") at 3 minutes cure time and the initial point where G" becomes constant from Rheometry.

TABLE 4

| | DSC | | Rheology | |
|---|---|---|---|---|
| Additive | Peak Reaction[5] time (min) | Total Cure ΔH (J/gram) | % ΔG" at 3 minutes | Constant G" Time (min) |
| none | 7.7 | 47 | −51 | 19 |
| 2 wt. % stearic acid | 7.2 ± 0.5 | 28 ± 9 | −25 | 24 |
| 2 wt. % TOFA/PEG 400 | 8.0 | 45 | −48 | 16 |
| 1 wt. % TOFA/PEG 400 | — | — | −49 | 19 |
| 2 wt. % TOFA/PEG 600 | 8.9 | 38 | — | — |
| 1 wt. % TOFA/PEG 600 | 8.1 | 26 | −47 | 19 |
| 2 wt. % stearic acid + 2 wt. % TOFA/PEG 400 | — | — | −22 | 15 |

[5]Peak Reaction = peak exotherm placement. All exotherms returned to the baseline at 19.3 ± 0.2 miutes. Peak magnitudes were all less than 10 microwattts.

As illustrated by the foregoing example, the TOFA/PEG 400 additive does not adversely effect the cure speed or degree of cure of the polyisoprene elastomeric composition either with or without stearic acid. The degree of cure is greater however without stearic acid. In contrast, the TOFA/PEG 600 additive slightly retards the cure of the elastomeric composition. Accordingly, the stearic acid does increase the rate of cure of the composition containing the TOFA/PEG 600 slightly, but also decreases the degree of cure and compound modulus of the composition.

Having described the invention and the preferred embodiments thereof, it will be recognized by those of ordinary skill that the invention may be subject to changes and variations within the spirit and scope of the appended claims.

What is claimed is:

1. A process for vulcanizing an elastomeric material which comprises:

premixing ZnO and an amount of amphiphilic triblock copolymer (ATC) sufficient to provide a dispersion of ZnO in the ATC, the ATC being selected from the group consisting of rosin diesters and $C_{18}$–$C_{24}$ fatty acid diesters of polyethylene glycol (PEG), the PEG having a molecular weight of from about 350 to about 1000 amu;

combining the ZnO/ATC dispersion with an elastomeric component and sulfur to provide a reaction mixture; and vulcanizing the reaction mixture.

2. The process of claim 1 wherein the elastomeric component is less polar than neoprene.

3. The process of claim 1 wherein the elastomeric component is selected from the group consisting of polyisoprene (PI), polybutadiene (PBD), styrene-butadiene rubber (SBR) and ethylene-propylene-diene monomer (EPDM).

4. The process of claim 1 wherein reaction the mixture contains from about 1% to about 4% by weight of ZnO based on the elastomeric component in the composition.

5. The process of claim 4 wherein the reaction mixture contains from about 10 to about 100% by weight of ATC based on the weight of ZnO in the mixture.

6. The process of claim 1 wherein the ATC is an unsaturated fatty acid diester of polyethylene glycol having an amu of from about 400 to about 800.

7. The process of claim 1 wherein the ATC is an unsaturated tall oil fatty acid diester of polyethylene glycol having an amu of from about 400 to about 600.

8. The process of claim 1 wherein the fatty acid of the diester is selected from the group consisting of oleic acid, linoleic acid and tall oil fatty acid.

9. The process of claim 1 wherein the ZnO is premixed with molten ATC.

10. The process of claim 1 wherein the ATC and ZnO are premixed as solids.

11. A vulcanized elastomeric composition made by the process of claim 1.

12. A vulcanizable elastomeric composition comprising an elastomeric component, sulfur, and a dispersion of ZnO in an amphiphilic triblock copolymer (ATC) selected from the group consisting of rosin diesters and $C_{18}$–$C_{24}$ fatty acid diesters of polyethylene glycol (PEG) 350 to PEG 1000 amu wherein the amount of ZnO in the composition ranges from about 1% to about 4% by weight based on the elastomeric component and the amount of ATC ranges from about 10 to about 100% by weight based on the weight of ZnO in the composition.

13. The composition of claim 12 wherein the elastomeric component is less polar than neoprene.

14. The composition of claim 12 wherein the elastomeric component is selected from the group consisting of polyisoprene (PI), polybutadiene (PBD), styrene-butadiene rubber (SBR) ethylene-propylene-diene monomer (EPDM).

15. The composition of claim 12 wherein the ATC is a fatty acid diester of polyethylene glycol having an amu of from about 400 to about 800.

16. The composition of claim 15 wherein the fatty acid of the diester is selected from the group consisting of oleic acid, linoleic acid and tall oil fatty acid.

17. A vulcanized elastomeric material comprising an elastomeric matrix containing one or more zinc salts and an amphiphilic triblock copolymer material (ATC) selected from the group consisting of rosin diesters and $C_{18}$–$C_{24}$ fatty acid diesters of polyethylene glycol (PEG) 350 to PEG 1000 dispersed in the elastomeric matrix.

18. The elastomeric material of claim 17 wherein the elastomeric matrix is less polar than neoprene.

19. The elastomeric material of claim 17 wherein the elastomeric matrix is selected from the group consisting of polyisoprene (PI), polybutadiene (PBD), styrene-butadiene rubber (SBR) and ethylene-propylene-diene monomer (EPDM).

20. The elastomeric material of claim 17 wherein elastomeric matrix contains from about 1% to about 4% by weight of ZnO based on the elastomeric matrix in the material.

21. The elastomeric material of claim 20 wherein the matrix contains from about 10 to about 100% by weight of ATC based on the weight of ZnO in the matrix.

22. The elastomeric material of claim 21 wherein the molecular weight of the polyethylene glycol ranges from about 400 amu to abut 800 amu.

23. The elastomeric material of claim 22 wherein the fatty acid of the diester is selected from the group consisting of oleic acid, linoleic acid and tall oil fatty acid.

* * * * *

UNITED STATES PATENT AND TRADEMARK OFFICE
CERTIFICATE OF CORRECTION

PATENT NO : 5,840,801
DATED : November 24, 1998
INVENTOR(S): Eric S. Gardiner

It is certified that error appears in the above-identified patent and that said Letters Patent is hereby corrected as shown below:

Column 1, line 21, after "special" insert -- , --.

Column 2, line 7, after "sulfates" insert -- , --.

Column 3, line 39, after "envelopes" insert -- , --.

Column 4, line 3, change "lineolenic" to -- linoleic --.

Column 4, line 59, change "fme" to -- fine --.

Column 7 line 43, change "microwattts" to -- microwatts --.

Column 9, Claim 22, change "abut" to -- about --

Signed and Sealed this

Sixth Day of July, 1999

Q. TODD DICKINSON

Attest:

Attesting Officer

Acting Commissioner of Patents and Trademarks